Jan. 27, 1970  G. H. YOWELL  3,491,699

POWER TRANSMISSION

Filed Feb. 26, 1968  2 Sheets-Sheet 1

INVENTOR.
GORDON H. YOWELL

BY

ATTORNEYS

Jan. 27, 1970     G. H. YOWELL     3,491,699

POWER TRANSMISSION

Filed Feb. 26, 1968     2 Sheets-Sheet 2

INVENTOR.
GORDON H. YOWELL
BY
*Van Pelter and George*
ATTORNEYS

United States Patent Office 3,491,699
Patented Jan. 27, 1970

3,491,699
POWER TRANSMISSION
Gordon H. Yowell, North Branch, Mich., assignor to Sperry Rand Corporation, Troy, Mich., a corporation of Delaware
Filed Feb. 26, 1968, Ser. No. 708,060
Int. Cl. F04c 1/00, 1/04, 3/00
U.S. Cl. 103—136                    5 Claims

ABSTRACT OF THE DISCLOSURE

A rotary fluid pressure energy translating device having a floatable mounted cartridge assembly including a vane carrying rotor circumscribed by an axially shiftable cam ring and enclosed by a pair of axially shiftable elastic deflectable cheek plates which are adapted to be urged and deflected into fluid sealing engagement with the rotor in response to hydraulic pressure applied thereto and an annular recess formed in each of the cheek plates to limit said deflection.

Background of the invention

This invention relates to power transmissions and is particularly applicable to those of the type comprising two or more fluid pressure energy translating devices, one of which may function as a pump and another as a fluid motor.

The invention relates generally to rotary fluid pumps and particularly to those of the vane type.

One of the major problems encountered in designing rotary pumps is that of providing proper clearance between the rotor faces, and the surfaces against which they rotate. There should be a slight clearance in order for the rotor to run freely but the clearance should not be too high because of decreasing the volumetric efficiency of the pump. Where the abutting surfaces are stationary, the parts must be machined to very close tolerances, and in spite of maintaining close manufacturing tolerances, leakage will increase as the operating pressure increases and with changes in the viscosity of the fluid medium.

In devices of the rigidly clamped, fixed side type, leakage will increase even though the running clearance be small and even where it is possible to maintain the small running clearance fixed under high pressure operating conditions. Actually, under extremely high pressure operating conditions, the high pressure existing along the outer faces of the rotor tend to deflect the inner faces of the cheek plates outwardly away from the rotor which tends to increase the running clearance between the rotor and cheek plates and further increase leakage.

In rotary pumps or motors utilizing a single cheek plate of the pressure loaded type, leakage between the rotor face on one side may be maintained substantially constant or even reduced with increases of pressure by utilizing a deflectable type of cheek plate as disclosed in the patent to Duncan B. Gardiner et al., No. 2,544,988. This does not, however, reduce the leakage factor on the opposite side of the rotor face. In some single pressure loaded cheek plate devices under extremely high pressure conditions demanded in many present day hydraulic applications, there is a tendency for the inner surface of the fixed cheek plate on the opposite side of the rotor to deflect outwardly to increase the leakage path, thus, the problem is multiplied with the result that volumetric efficiency is materially reduced.

It is therefore necessary at high pressures to adequately control the leakage paths on both sides of the rotor as well as to provide proper clearance between the rotor faces and the surfaces against which they rotate.

One method for minimizing or controlling the leakage paths on each side of the rotor while improving the volumetric efficiency of the pump is to provide a balanced removable cartridge unit which incorporates a symmetrical dual floating pressure plate system designed to maintain a given ring rotor clearance space independent of load pressure, such as the type disclosed in the patent to Raymond B. Pettibone, No. 3,187,678. Such floating cartridge type pumps are a great improvement over the fixed type and single plate type.

The amount of clearance between the rotor and cheek plate is dependent upon several factors, including: the relationship between the effective pressure areas which act to maintain the cheek plates in fluid sealing engagement with the ring and rotor; the design and the material of the cheek plates which determines the amount of deflection of the loaded cheek plates; the initial clearance between the pressure plate and rotor before pressure is applied. By varying any or all of these factors, a proper running clearance may be achieved.

In units of this type, the deflection of the pressure loaded cheek plate toward the rotor becomes more evident as the operating pressure of the unit increases. With this increase in cheek plate deflection, there is a corresponding increase in the possibility of rotor-cheek plate wear and seizure.

As the operating pressure is increased, a minimum amount of deflection may be maintained by using a material of greater strength, by increasing the thickness of the present material, by changing its physical structure (such as adding webbing to the cheek plate), or by reducing the area of the cheek plate exposed to pressure. Such corrective measures are undesirable in that they result in either a more expensive, or larger unit, or a decrease in volumetric efficiency.

Summary of the invention

This invention comprises a rotary fluid pressure energy translating device having a deflectable pressure responsive cheek plate floatably mounted therein and adapted to abut a cam ring having a pumping mechanism therein in which the deflection of the cheek plate inwardly towards the pumping mechanism will determine the clearance between the same; the cheek plate having a controlled undercut between the opposite cheek surfaces of the pressure plate to provide a more precise control of the deflection of the cheek plate surface abutting the pumping mechanism.

It is therefore an object of this invention to provide a fluid pressure energy translating device having a pressure loaded deflectable cheek plate therein and means for controlling the amount of deflection of said cheek plate.

Another object of this invention is to provide a fluid pressure energy translating device of the type hereinbefore described which is capable of operating at very high pressures without increasing wear between the cheek plate and pumping mechanism and without decreasing volumetric efficiency.

A still further object of the invention is to provide a fluid pressure energy translating device having the hereinbefore mentioned advantages without resorting to larger units or expensive corrective measures.

Further objects and advantages of the present invention will be apparent from the following description, reference being made to the accompanying drawings wherein a preferred from of the present invention is clearly shown.

Figure 1:
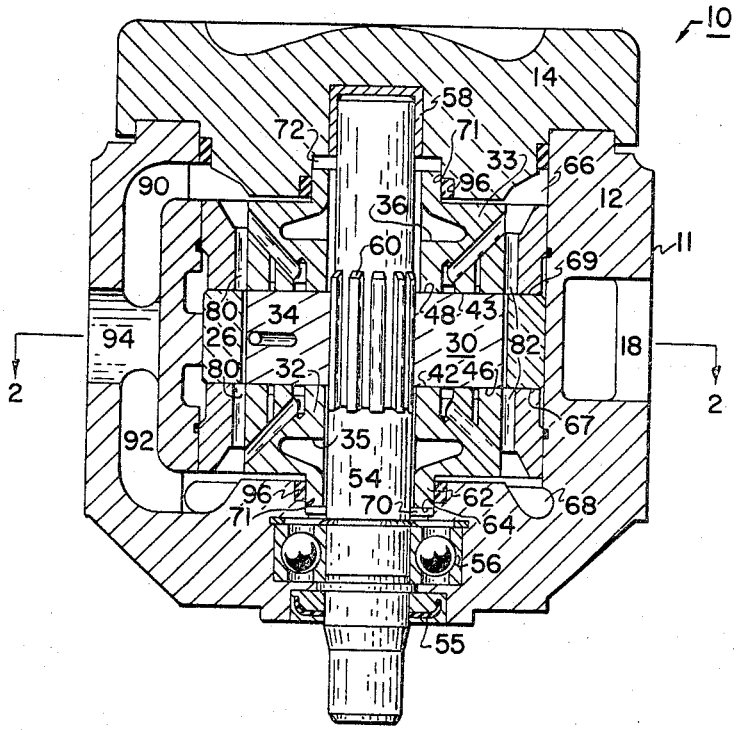
FIG. 1 is a sectional view of a preferred form of the present invention taken on line 1—1 of FIG. 2.
Figure 2:
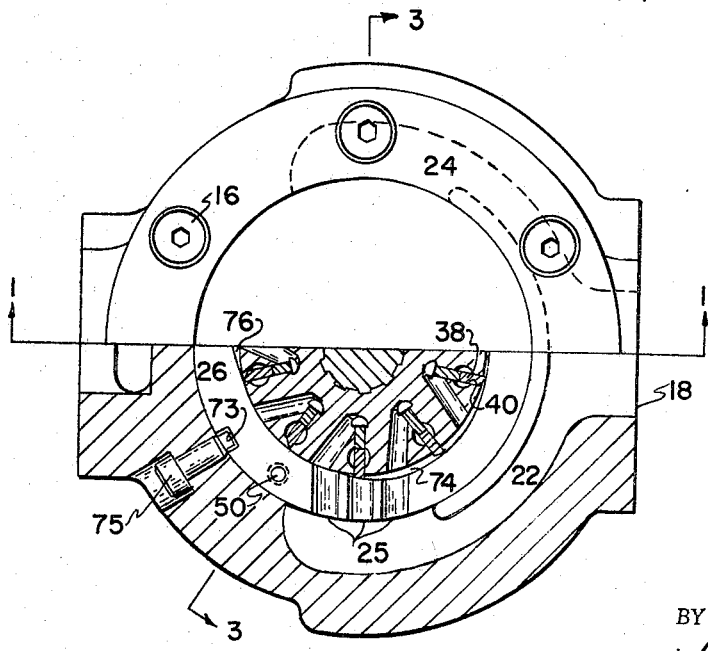
FIG. 2 is a plain view of the preferred form showing a section which is taken on line 2—2 of FIG. 1.
Figure 3:
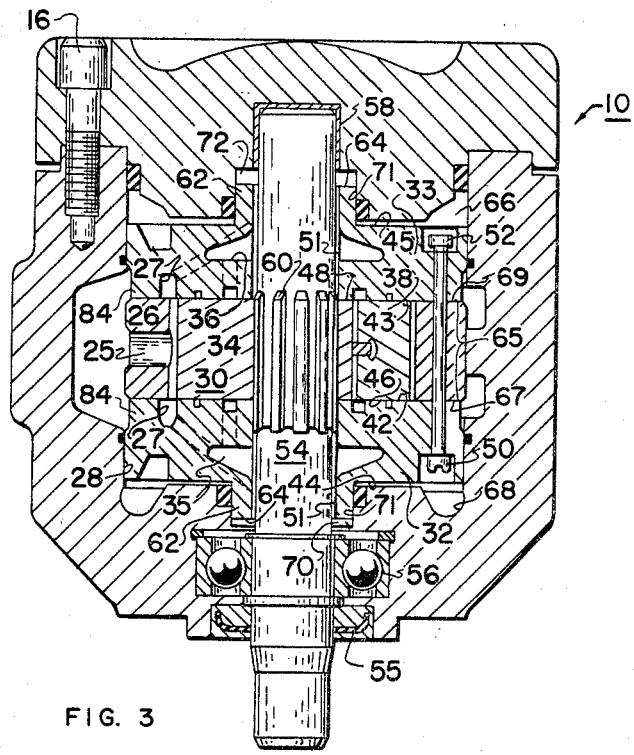
FIG. 3 is a sectional view taken on line 3—3 of FIG. 2.

Referring now to the figures, and especially FIG. 1, there is shown a rotary sliding vane device or pump, indicated generally by the numeral 10, the housing 11 of which comprises a body member 12 and an end cover 14 which is secured to the body 12 by bolts 16 extending through cover 14 into the threaded holes provided in the body 12. The body member 12, as shown in FIG. 2, is provided with an inlet supply connection 18 having an operating passage leading therefrom and dividing into the two branched passages 22 and 24 respectively, extending in opposite directions, each branch terminating in a plurality of fluid inlet ports 25 located in a ring 26 and in a pair of fluid inlet ports 27 provided in a pair of pressure loaded cheek plates 32 and 33. The housing 11 has a cylindrical bore 28 in which is floatably mounted a symmetrically arranged cartridge unit 30.

Devices using axialy floating pumping cartridges of the rotary sliding vane type are well-known in the art, and reference may be made to Patent No. 3,187,678, issued to Raymond B. Pettibone for a description and explanation of the operation and assembly of such a device.

In such devices, the cartridge 30 is comprised of a cam ring 26, a pumping mechanism or rotor 34, which is rotatable in the cam ring 26, and a pair of identical and interchangeable elastic deflectable pressure loaded cheek plates 32 and 33, one positioned on each side of the rotor 34 and ring 26. A plurality of vanes 38 are movable in and out of the slots 40 provided in the rotor 34 as the rotor turns around the cam ring 26. Each cheek plate 32 and 33 has identical inner faces 42 and 43, identical outer faces 44 and 45, the inner face 42 being positioned directly opposite the rotor face 46 and the inner face 43 being positioned directly opposite the rotor face 48 so as to provide a small running clearance between the plate 32 and 33 and the side faces on surfaces of the rotor 34. Each cheek plate 32 and 33 has annular recesses 35 and 36, respectively, which extend from the periphery of the inner bores 51 extending through each plate. The purpose of the recesses will be explained hereinafter. A pair of bolts 50 extend through the plates 32 and 33 and ring 26. Nuts 52 hold the cartridge unit 30 together. The nut and bolt assemblies hold the ring 26, rotor 34, and plates 32 and 33 together as the cartridge unit 30 for assembly convenience as well as to prevent radial rotation of the plates 32 and 33 in the bore 28. The nut 52 is usually loosely fitted on the bolts 50 and has no effect on mechanically loading the bolt 50, thus, the cheek plates are considered as being flotably mounted.

The rotor 34 is driven by a shaft 54 extending through bores 51 and is supported solely within the body 12 by means of a bearing 56 located near one end of the bore 28 in the body 12 and a bearing 58 located in the cover 14 at the other end of the bore 28. The shaft 54 is operatively connected to the rotor 34 by means of a spline connection indicated by the numeral 60 and is further provided with a shaft seal 55 which prevents leakage at the juncture of the shaft 54 from the pump body 12.

A stepped-up portion 62 on each outer face 44 and 45 of each cheek plate forms an internal annular hub member 64.

The cartridge unit 30 defines with the housing 11 and with the outer ends of the bore 28, a pair of operating pressure chambers 66 and 68 which act against the annular space at the outer rims starting at the outer periphery of each cheek plate and extending inwardly to the hubs 64 so as to urge the cheek plates 32 and 33 into fluid sealing engagement with a portion of the outer surfaces of the rotor 34 and the cam ring 26 in a manner to be described later. The plates 32 and 33, respectively, about the cam ring side surfaces 67 and 69 in a generally annular region 65 located near the periphery of each plate face 42 and 43.

A pair of low pressure chambers 70 and 72 are also located one on each end of the bore, and are connected to the inlet side of the pump 10. The chambers 70 and 72 are connected to the recesses 35 and 36 by means of the annular space formed between the outer and inner peripheries of the shaft 54 and bores 51, respectively. The low pressure chambers 70 and 72 are formed by the hub member 64 with the housing surface directly opposite therefrom. Each of the low pressure chambers 70 and 72 have a circumferential surface 71 in the housing 11 in which the stepped-up portion 62 of the floating cheek plates 32 and 33 telescopically engages.

A rectangular slot or chamfered hole 73 is provided in the ring 26. A locating pin 75 is adjustably inserted in the housing 11 so as to engage the hole 73, thereby preventing the ring 26 from radially rotating in the bore 28. The diameter of the hole 73 is of such a size so as to permit the cam ring 26, and thus the cartridge unit 30, to move axially in the bore 28 in response to the summation of the hydraulic forces acting thereon. The cartridge assembly 30 is considered to be freely floating in the bore 28.

With the rotor 34 mounted within the cam ring 26, two opposing working chambers 74 and 76 are formed through which the vanes 38 pass as the rotor 34 turns. These chambers may be divided into fluid inlet zones and fluid outlet zones, the former of which comprise that portion of the chambers 74 and 76 registering with the plurality of inlet passages 25, provided in the ring 26 and with the pair of diametrically opposed fluid ports 27 provided in each of the cheek plates 32 and 33. The outlet zones comprise that portion of the chambers registering with a pair of diametrically opposed fluid outlet ports 80 and 82 in each of the cheek plates 32 and 33.

The floatable cartridge unit 30 is usable with any type of a vane construction and for the purpose of illustration, the rotor 34 employs intravanes 38, the operation of which and the pressure transmitting arrangement therefor are well-known and are described in the herebefore mentioned patent to Pettibone.

The pair of inlet ports 27 provided in each of the cheek plates 32 and 33 are, in effect, cut out portions in each plate 32 and 33 which start at a point on the outer periphery of the flange near the mid-section thereof and extend radially, inwardly, and then extend in an axial direction to the inner face 42 and 43 of each plate. Boss means 84 are located in each of the inlet ports 27 and are flush with the inner surfaces of the cheek plates 32 and 33 so as to engage the ring 26.

The fluid outlet ports 80 and 82 are in communication with the pressure chambers 66 and 68. A pair of converging outlet operating high pressure passages 90 and 92 connect each of the pressure chambers with the outlet connection 94 located in the housing 11. A plurality of "O" rings 96 are provided at strategic locations so as to prevent leakage.

Figure 4:
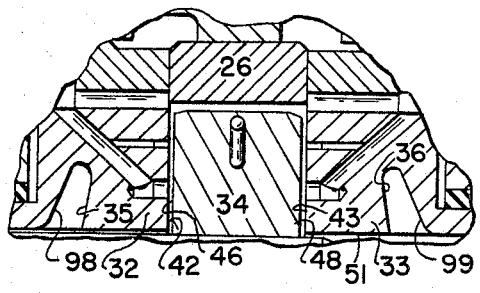
FIG. 4 is a fragmentary view of FIG. 1, showing rotor clearance in exaggerated form.
Figure 5:
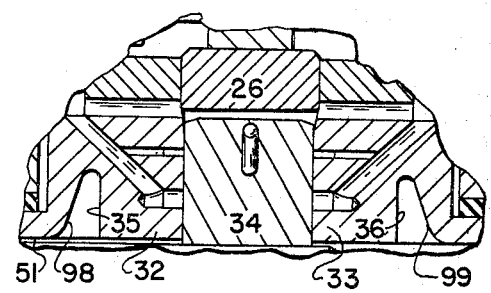
FIG. 5 is a fragmentary view similar to FIG. 4, but showing rotor clearance upon deflection of the cheek plate.

As herebefore mentioned, the hydraulic pressure in the chambers 66 and 68, respectively, acts against a portion of the outer faces 44 and 45 of each cheek plate 32 and 33 in order to urge and deflect the cheek plates into fluid sealing engagement and mechanical abutment with the opposite side surfaces 46 and 48 of the rotor 34 and with the opposite side surfaces 67 and 69 of the cam ring, respectively. As shown in exaggerated form in FIG. 4, the cam ring 26 is of slightly greater width than the rotor 34 to provide a proper running clearance between the inner faces of the cheek plates and opposite side surfaces of the rotor. As the cheek plates are adapted to deflect slightly as shown in exaggerated form in FIG. 5, the amount of running clearance is dependent upon the design of the cheek plate and the material of which it is constructed. An elastic deflectable cheek plate of a suitable material, such as cast iron, may be used. In the device illustrated, the running clearance is on the order of a thousandth of an inch.

It should be noted that the sole support against the inward movement of the cheek plate is that portion of the cam ring against which the peripheral edge of the cheek plate is forced by the pressure fluid in the chambers 66 and 68. The remainder of the cheek plate within the cam ring is entirely unsupported against inward axial movement because of the clearance provided between the rotor and the cheek plate. The cheek plate of the present device is designed to provide a predetermined deflection of its unsupported surface as a function of the pressure existent across the rotor faces 46 and 48 and the pressure existent in the chambers 66 and 68 correlated with the size of the undercut areas extending from the periphery of the shaft bore 51 into the plates and which form the annular recesses 35 and 36. As the pressure in the chambers 66 and 68 increases, the cheek plates will deflect toward the rotor and reduce the rotor clearance, but the amount of deflection will be much less at higher pressures than in the case of conventional cheek plates because of the annular recesses 35 and 36. The undercut areas forming recesses 35 and 36 are continuously at low pressure, being connected to low pressure chambers 70 and 72. As high pressure is applied to cheek plate surfaces 44 and 46 while recesses 35 and 36 are under low pressure, the surfaces 98 and 99 of said recesses being unsupported are allowed to bend or absorb some of the bending movement ahead of the inner surfaces 42 and 43 of the cheek plates.

By providing the annular recesses 35 and 36 in each cheek plate, the amount of plate deflection may be limited. As herebefore mentioned, the cheek plate will tend to be deflected toward the rotor as pressure is applied to the outer surfaces of the plates, however, the amount of deflection of the surfaces 98 and 99 associated respectively with the recesses 35 and 36 will be greater than the inner surfaces 42 and 43. The bending movement created by the pressure acting on the outer surfaces of each plate will not be completely transmitted to that portion of the plate abutting the rotor, but will be partially absorbed by the sections of the plate associated with the surfaces 98 and 99. Thus, cheek plates having an annular recess therein may operate at a higher pressure level than cheek plates not having such a recess while the amount of deflection of the inner surfaces of the plate is not increased.

The amount of fluid sealing engagement between the cheek plate and rotor surfaces may be more precisely controlled by designing the size of the annular recesses in relation to the shape, thickness, material, and pressure to which it will be subjected.

It can thus be seen that the present invention has provided a fluid pressure energy translating device which is capable of operating at high pressures without increasing wear between the pressure loaded cheek plate and the rotor and without decreasing volumetric efficiency or resorting to expensive corrective measures.

While the form of embodiment of the present invention as herein disclosed constitutes a preferred form, it is to be understood that other forms might be adopted, all coming within the scope of the claims which follow.

What is claimed is as follows:

1. A fluid pressure energy translating device comprising:
   a housing including low and high pressure operating passages, one of which is an inlet passage and the other an outlet passage;
   a cam ring in said housing;
   a pumping mechanism rotatably mounted within said caming including means forming fluid inlet and fluid outlet zones;
   a fluid pressure responsive deflectable plate having hydraulic pressure applied to one face thereof, creating a force which is adapted to urge and deflect the opposite face thereof into fluid sealing engagement and mechanical abutment respectively with the side faces of said pumping mechanism and said cam ring;
   means forming passageways for connecting one of said fluid zones to one of said operating passages and the other of said fluid zones to the other of said operating passages and including means forming a relatively low pressure source; and
   means forming an annular recess of a predetermined size in said plate between said cheek plate faces continuously connected to said low pressure source for controlling the amount of deflection of said opposite face, said recess including an unsupported wall surface facing said pumping mechanism which in response to pressure applied to said one plate face deflects and absorbs some of the bending movement ahead of said opposite face.

2. A combination as in claim 1 wherein said pumping mechanism comprises a vane carrying rotor circumscribed by said cam ring, said cam ring being of greater width than said rotor.

3. A combination as in claim 1 wherein said plate has a pumping mechanism axial shaft bore and said recess extends into said plate from the periphery of said bore.

4. A fluid pressure energy translating device comprising:
   a housing including low and high pressure operating passages, one of which is an inlet passage, the other an outlet passage;
   a bore in said housing;
   a cartridge assembly floatably mounted in said bore, said assembly including a vane carrying rotor circumscribed by an axially shiftable cam ring of greater width than the rotor to form fluid inlet and fluid outlet zones which are enclosed by a pair of axially shiftable elastic deflectable cheek plates, the inner surfaces of which are adapted to be urged and deflected into fluid sealing engagement and mechanical abutment respectively with opposite side faces of the rotor and ring, said cheek plates having outer surfaces each of which has hydraulic pressure applied thereto, creating the motive forces for said urgement and deflection;
   means forming passageways for connecting one of said fluid zones to one of said operating passages and the other of said fluid zones to the other of said operating passages and including means forming a relatively low pressure source; and
   means forming an annular recess of a predetermined size in each plate between said cheek plate faces continuously connected to said low pressure source for controlling the amount of deflection of said opposite plate faces, each recess including an unsupported wall surface facing said pumping mechanism which in response to pressure applied to the said one face of the plate deflects and absorbs some of the bending movement ahead of said opposite face of the plate.

5. A combination as in claim 4 wherein each plate has an axial rotor shaft bore and said recess extends into said plate from the periphery of said bore.

References Cited

UNITED STATES PATENTS

| | | | |
|---|---|---|---|
| 3,187,678 | 6/1965 | Pettibone | 103—136 |
| 3,204,565 | 9/1965 | Kirkpatrick | 103—136 |
| 3,204,566 | 9/1965 | Feroy. | |
| 2,544,988 | 3/1951 | Gardiner et al. | 103—135 |
| 3,254,606 | 6/1966 | Rosaen | 103—136 |
| 3,311,064 | 3/1967 | Eichele et al. | 103—136 |
| 3,334,591 | 8/1967 | Dymond | 103—136 |
| 3,404,634 | 10/1968 | Connelly. | |

DONLEY J. STOCKING, Primary Examiner

W. J. KRAUSS, Assistant Examiner

U.S. Cl. X.R.

103—126